US012460606B2

(12) United States Patent
Del Rossa

(10) Patent No.: US 12,460,606 B2
(45) Date of Patent: Nov. 4, 2025

(54) FUEL INJECTOR SEAT REPAIR AND RECONDITIONING TOOL

(71) Applicant: Milton Industries, Inc., Chicago, IL (US)

(72) Inventor: Jeffrey Del Rossa, Pittsburgh, PA (US)

(73) Assignee: Milton Industries, Inc., Chicago, IL (US)

( * ) Notice: Subject to any disclaimer, the term of this patent is extended or adjusted under 35 U.S.C. 154(b) by 0 days.

(21) Appl. No.: 18/768,688

(22) Filed: Jul. 10, 2024

(65) Prior Publication Data

US 2024/0360805 A1 Oct. 31, 2024

Related U.S. Application Data

(63) Continuation of application No. 18/067,423, filed on Dec. 16, 2022, now Pat. No. 12,060,854.

(51) Int. Cl.
*F02M 21/02* (2006.01)

(52) U.S. Cl.
CPC . *F02M 21/0257* (2013.01); *F02M 2200/8069* (2013.01)

(58) Field of Classification Search
CPC .................. F02M 21/0257; F02M 2200/8069
See application file for complete search history.

(56) References Cited

U.S. PATENT DOCUMENTS

2022/0176474 A1* 6/2022 Munoz .................. B23B 29/025

FOREIGN PATENT DOCUMENTS

| CN | 202013168 A1 | 10/2011 | |
|---|---|---|---|
| CN | 202013168 U * | 10/2011 | |
| CN | 109482979 A * | 3/2019 | ............. B23D 79/00 |
| CN | 109482979 A1 | 3/2019 | |

OTHER PUBLICATIONS

Canadian Office Action for Application No. 3,220,204 dated Feb. 20, 2025.

* cited by examiner

*Primary Examiner* — Hung Q Nguyen
*Assistant Examiner* — Charles J Brauch
(74) *Attorney, Agent, or Firm* — BUCHANAN INGERSOLL & ROONEY PC

(57) ABSTRACT

Embodiments of the apparatus relate to a tool configured to repair and recondition a fuel injector seat. The tool includes a body having a working end and a rotary end, a rod extending through the body, wherein a first portion of the rod is exposed at or near the rotary end and a second portion of the rod is exposed at or near the working end, and a machining bit attached to the rod at or along the second portion of the rod, wherein the machining bit is configured to perform work on a fuel injector seat.

20 Claims, 7 Drawing Sheets

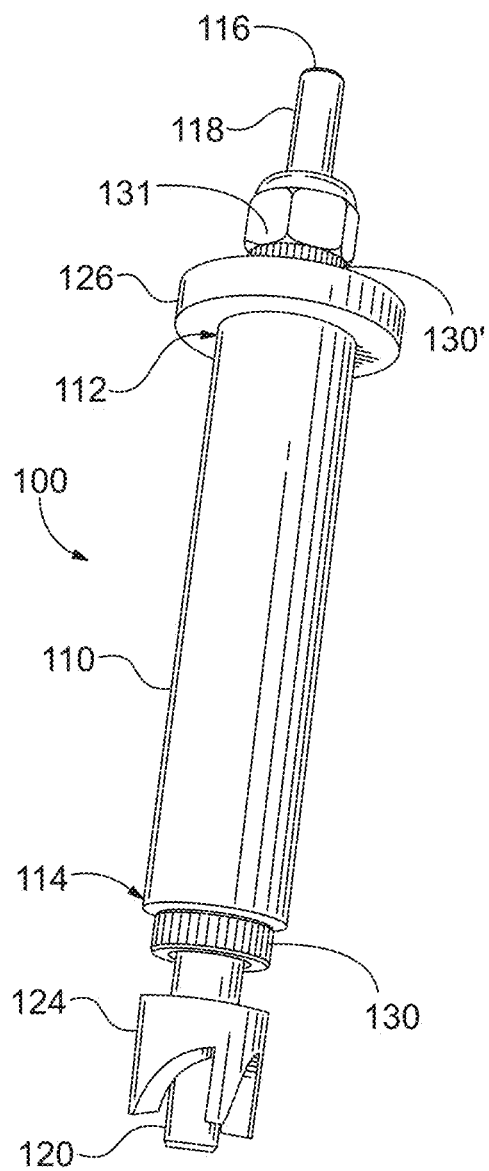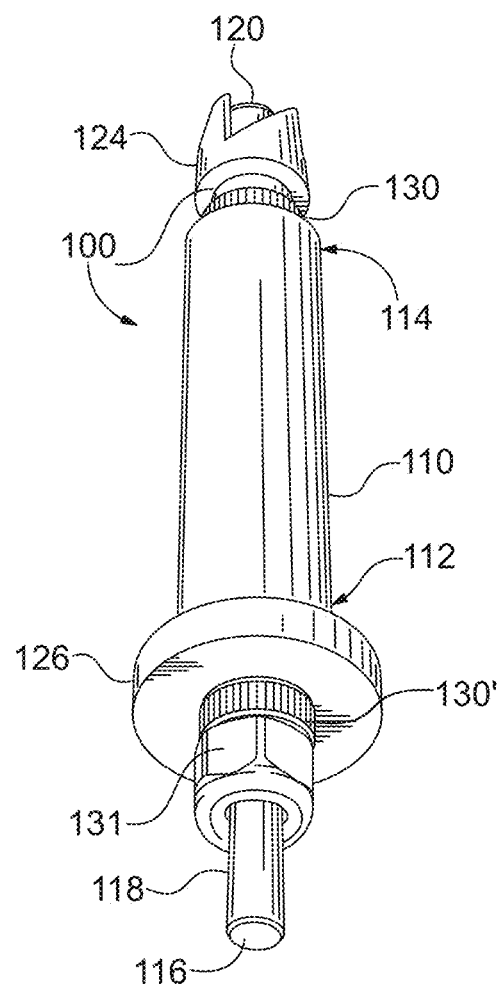
FIG. 3
FIG. 4

FUEL INJECTOR SEAT REPAIR AND RECONDITIONING TOOL

FIELD OF THE INVENTION

Embodiments relate to a tool configured to repair and recondition a fuel injector seat.

BACKGROUND OF THE INVENTION

Modern gas and diesel internal combustion engines, such as automotive and truck engines, require precise control of fuel delivery to a combustion chamber in order to operate at peak performance (such as efficiency, power, reliability, etc.). This fuel control is typically accomplished via a fuel injector, which provides a mechanism for reliably and accurately injecting fuel into the combustion chamber of the internal combustion engine. In typical embodiments, a fuel injector seat is used to seal the fuel injector to a cylinder head. Over time, the seat collects carbon deposits, a byproduct of combustion in an engine that comes from incomplete fuel combustion. This particularly occurs in Ford 6.7 L diesel engines. The extreme heat and cylinder cavity compression forces carbon deposits upward that can burn into and score the fuel injector seat, causing the injector-to-cylinder head seal to leak. This results in leaked gases that heat the fuel injector's O-ring beyond operating temperatures, thus hardening it and making it nearly impossible to remove for service or replacement. Accordingly, a tool is needed to repair and recondition a fuel injector seat, particularly fuel injector seats of a Ford 6.7 L diesel engine, so as to restore the seat to factory new and to restore critical sealing properties.

SUMMARY OF THE INVENTION

Embodiments relate to a tool that resurfaces the seat where the injector seals via a copper gasket against the inside of the cylinder head, particularly in the Ford 6.7 L diesel engine. Overtime, the seat collects carbon deposits which burn into the seat and scores it. This causes the injector-to-cylinder head seal to leak and results in exhaust gases blowing up into the injector valley reducing cylinder head compression and engine performance. Further, this results in the gases heating the O-ring of the injector, hardening it and making it nearly impossible to remove for service or replacement. The tool is designed to restore the injector seat within seconds by removing a very small amount (e.g., about 0.005") of material from the injector seat. The tool essentially machines the seat to factory new and restores the sealing properties of the copper gasket.

Embodiments of the apparatus relate to a tool configured to repair and recondition a fuel injector seat. The tool includes a body having a working end and a rotary end, a rod extending through the body, wherein a first portion of the rod is exposed at or near the rotary end and a second portion of the rod is exposed at or near the working end, and a machining bit is attached to the rod at or along the second portion of the rod, wherein the machining bit is configured to perform work on a fuel injector seat.

In an exemplary embodiment, an apparatus comprises a body having a working end and a rotary end, a rod extending through the body, wherein a first portion of the rod is exposed at or near the rotary end and a second portion of the rod is exposed at or near the working end, and a machining bit attached to the rod at or along the second portion of the rod, wherein the machining bit is configured to perform work on a fuel injector seat.

In some embodiments, the fuel injector seat is the fuel injector seat of a Ford 6.7 L diesel engine.

In some embodiments, the apparatus further comprises a collar attached to the body at or near the rotary end, wherein the collar is configured to engage a head of the fuel injector seat.

In some embodiments, the apparatus further comprises a rotary unit configured to mount the first portion of the rod.

In some embodiments, rotation of the rotary unit causes rotation of the rod.

In some embodiments, the apparatus further comprises a first bushing positioned at or near the first portion of the rod and a second bushing positioned at or near the first portion of the rod, wherein the first and second bushings are configured to adjust the positions of the rod and the bit.

In some embodiments, the apparatus further comprises a locknut positioned at or near the first portion of the rod, wherein the locknut is configured to adjust the positions of the rod and the machining bit.

In some embodiments, the locknut is a dial.

In some embodiments, the second portion of the rod extends into a fuel injector port.

In an exemplary method of resurfacing a fuel injector seat, comprising inserting a tool into the fuel injector seat, wherein the tool comprises a body having a working end and a rotary end, a rod extending through the body, wherein a first portion of the rod is exposed at or near the rotary end and a second portion of the rod is exposed at or near the working end, and a machining bit attached to the rod at or along the second portion of the rod, wherein the machining bit is configured to perform precision work on the fuel injector seat.

In some embodiments, the fuel injector seat is the fuel injector seat of a Ford 6.7 L diesel engine.

In some embodiments, the tool further comprises a collar attached to the body at or near the rotary end, wherein the collar is configured to engage a head of the fuel injector seat, and the method further comprises positioning the tool such that the collar abuts the head of the fuel injector seat.

In some embodiments, the method further comprises positioning the tool such that the second portion of the rod extends into a fuel injector port.

In some embodiments, the method further comprises mounting the first portion of the rod with a rotary unit.

In some embodiments, the method further comprises rotating the rotary unit, and performing work on the fuel injector seat.

In some embodiments, the tool further comprises a first bushing positioned at or near the second portion of the rod and a second bushing positioned at or near the first portion of the rod, wherein the first and second bushings are configured to adjust the positions of the rod and the machining bit, and the method further comprises adjusting the positions of the rod and the machining bit using the first and second bushings.

In some embodiments, the method further comprises adjusting the positions of the rod and the machining bit using the first and second bushings such that the machining bit is configured to resurface 0.005" of material from the fuel injector seat.

In some embodiments, the tool further comprises a locknut positioned at or near the first portion of the rod, wherein the locknut is configured to adjust the positions of the rod and the machining bit, and the method further comprises adjusting the positions of the rod and the machining bit using the locknut.

In some embodiments, the method further comprises adjusting the positions of the rod and the machining bit using the locknut such that the machining bit is configured to resurface. 005" of material from the fuel injector seat.

In some embodiments, the method further comprises resurfacing 0.005" of material from the fuel injector seat.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIG. 3 shows an exemplary tool.

FIG. 4 shows an exemplary tool.

DETAILED DESCRIPTION OF THE INVENTION

Figure 1:
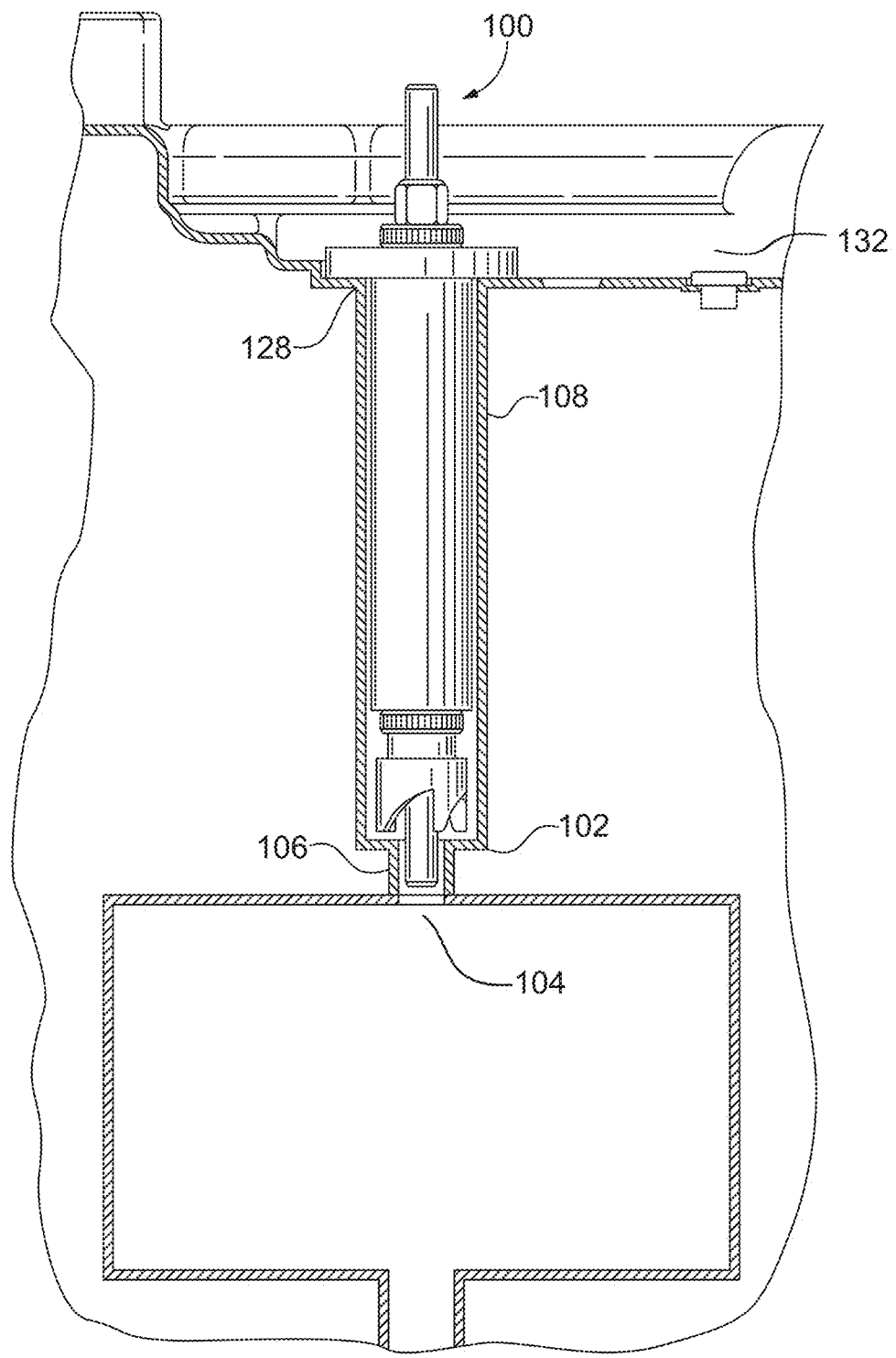
FIG. 1 is a cross section view of an exemplary tool in a combustion engine assembly.

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Embodiments relate to a tool 100 used to repair and recondition a fuel injector seat 102. In a typical setup, fuel injector seats 102 are used to seal fuel injectors to a cylinder head 104. The area between the fuel injector seat 102 and the cylinder head 104 is known as the fuel injector port 106. A fuel injector seat 102 has different sections that correspond to the fuel injector, including the fuel injector valley 108, which surrounds body of the fuel injector. A fuel injector typically has two seals—an O-ring to seal its connection to the fuel system, and a gasket (e.g., a copper gasket) to ensure an air pressure tight seal with the cylinder head 104. When in service, the fuel injector seat 102 may collect hot carbon deposits, a byproduct of combustion in an engine. The carbon deposits can burn into and score the fuel injector seat 102, causing the injector-to-cylinder head gasket seal to leak. This results in the leaked gases to heat the fuel injector's O-ring, thus hardening it and making it nearly impossible to remove for service or replacement. This can lead to costly and timely repairs. The inventive tool 100 provides for a technical solution to this issue.

Figure 2:
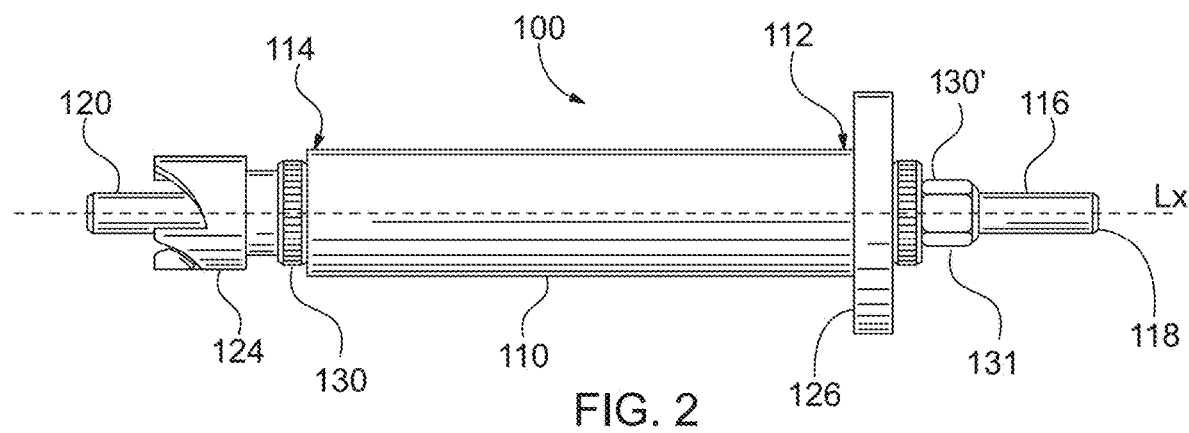
FIG. 2 shows an exemplary tool.

The tool 100 includes a body 110 comprising a rotary end 112 and a working end 114. Each of the rotary end 112 and the working end 114 is shown to form a planar terminus, but any one or combination of the rotary end 112 and working end 114 need not be planar in shape. The tool 100 is configured to engage a rotary unit 122 at or near the rotary end 112, and the tool 100 is configured to perform work on the fuel injector seat 102 at or near the working end 114. A longitudinal axis Lx (see FIG. 2) runs from the rotary end 112 to the working end 114 such that the rotary end 112 is opposite of the working end 114. The body 110 may be cylindrical in shape with a circular cross-section when viewed along the longitudinal axis Lx. Other cross-sectional shapes can be used, such as triangular, square, hexagonal, etc. It is contemplated for the body 110 to complement the shape of the fuel injector valley 108 of the fuel injector seat 102. The body 110 may have a diameter/width less than or equal to the diameter/width of the fuel injector valley 108.

The tool 100 further comprises a rod 116. It is contemplated that the body 110 may have a bore extending along the longitudinal axis Lx such that the rod 116 may be positioned within the body 110 (e.g., the body 110 and the rod 116 may be coaxial and concentric) and extend along the longitudinal axis Lx. It is contemplated that the rod 116 may complement the shape of the bore of the body 110. The rod 116 may have a length greater than the length of the body 110 such that a first portion 118 of the rod 116 extends beyond the body 110 and is exposed at or near the rotary end 112 and a second portion 120 of the rod 116 extends beyond the body 110 and is exposed at or near the working end 114. The first portion 118 of the rod 116 is configured to engage a rotary unit 122. The receiving element of the rotary unit 122 may complement the cross-sectional shape of the rod 116, which may be a circle, square, hexagon, star-shape, etc. The rotary unit 122 can be a drill (e.g., air or electric powered drill), knob (e.g., knurled hand knob), 122, ratchet, rotary tool, etc. The rotary unit 122 may mount on the first portion 118 of the rod 116 such that the rotary unit 122 may rotate the rod 116. Specifically, the connection between the first portion 118 of the rod 116 and the rotary unit 122 causes rotary motion to be transferred to the rod 116 to cause the rod 116 to rotate about the longitudinal axis Lx. The second portion 120 of the rod 116 may be configured to extend through the fuel injection port 106.

It is contemplated that while the rotary unit 122 may rotate the rod 116, the body 110 remains fixed (e.g., stationary).

The tool 100 further comprises a machining (or reconditioning) bit 124 at or near the working end 114. The machining bit 124 may be any shape or configuration, but it is contemplated that the machining bit 124 be a cylindrical or annular formation around the longitudinal axis Lx with an outside diameter less than or equal to the diameter of the fuel injector seat 102. The machining bit 124 may attached to the rod 116 at or along the second portion 120 of the rod 116. The machining bit 124 is configured to make contact with and perform work on the fuel injector seat 102. When actuated, the machining bit 124 may resurface and/or recondition the fuel injector seat 102. It is understood that resurfacing and reconditioning includes removing a very small amount (e.g., 0.005", although it is contemplated that this amount may be adjustable) of material from the fuel injector seat 102. The machining bit 124 is configured to remove material from the fuel injector seat 102. For instance, the machining bit 124 may comprise cutting edges, jagged edges, blades, teeth, etc. on its surface configured to contact the material. It is contemplated that when a rotary unit 122 mounts the first portion 118 of the rod 116 such that the rotary unit 122 may rotate the rod 116, the rotary unit 122 causes rotary motion to be transferred to the machining bit 124, thus causing the machining bit 124 to rotate about the longitudinal axis Lx and perform work on the fuel injector seat 102.

Figure 5:
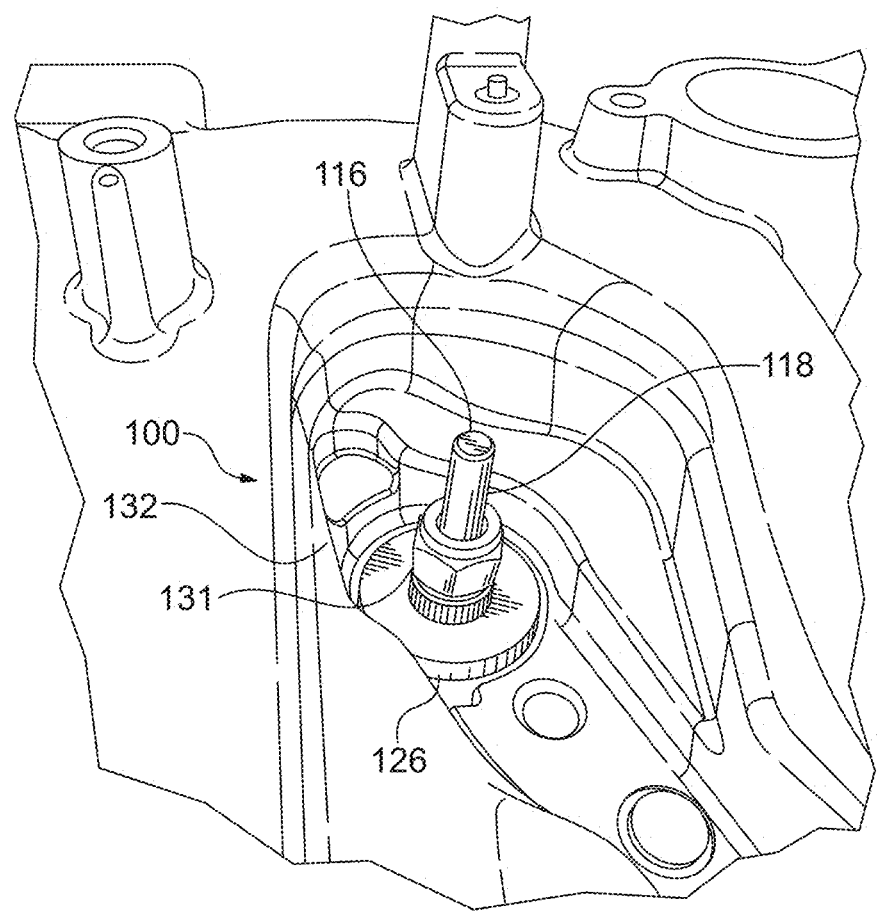
FIG. 5 shows an illustration of an exemplary tool in a combustion engine assembly.
Figure 6:
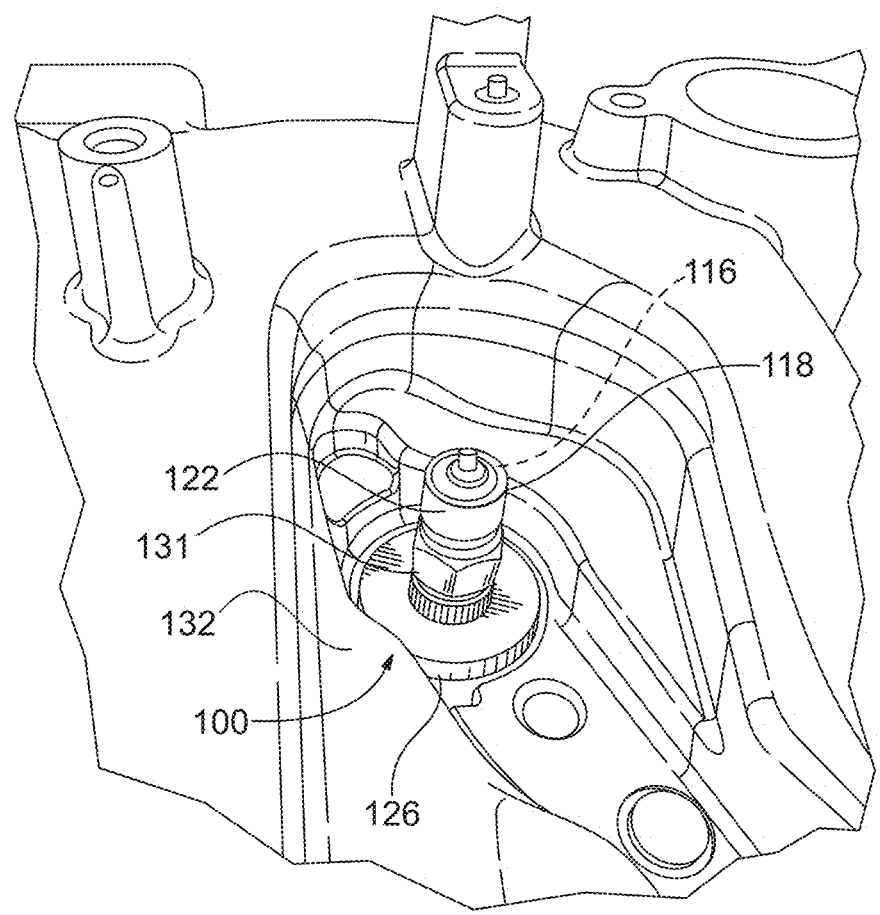
FIG. 6 shows an illustration of an exemplary tool and rotary unit in a combustion engine assembly.
Figure 7:
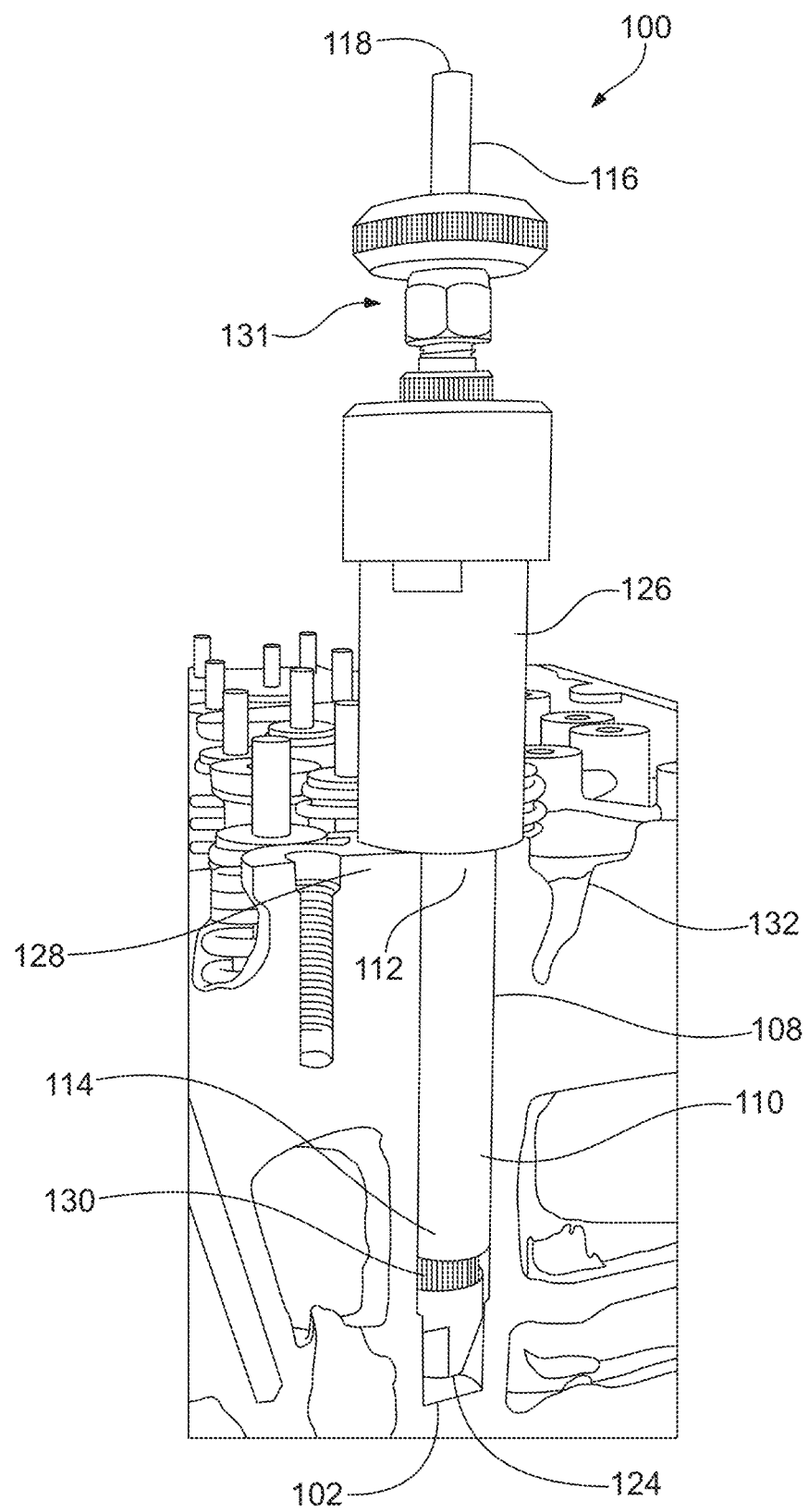
FIG. 7 shows an exemplary tool in a combustion engine assembly.
Figure 8:
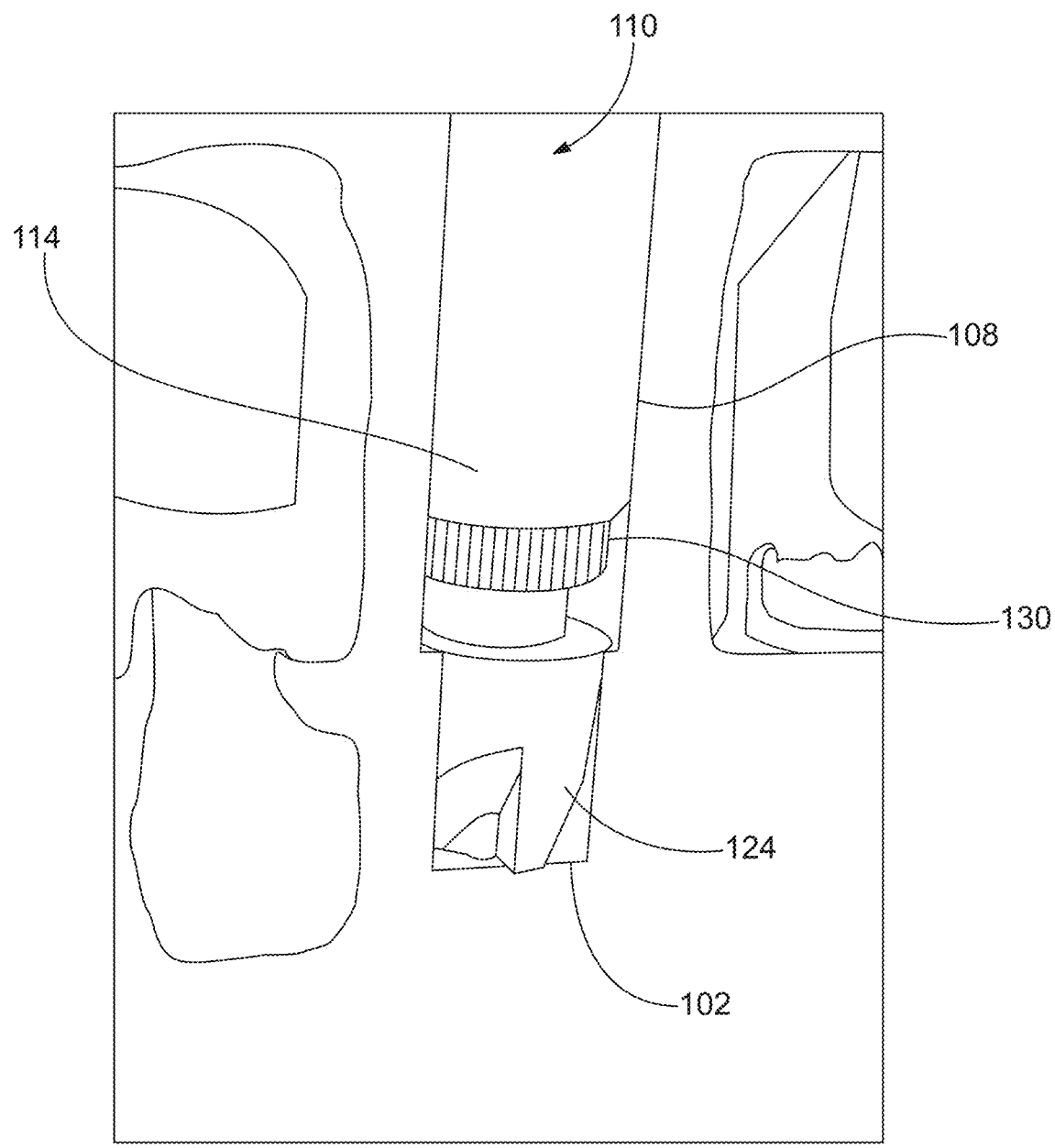
FIG. 8 shows an exemplary working end of a tool.

The body 110 may further comprise a collar 126 formed at or near the rotary end 112. The collar 126 is configured to position the body 110 precisely within the fuel injector valley 108 (and in some embodiments the second portion of the rod 120 in the cylinder head 104) thereby establishing a fixed controlled distance between the top of the valve cover 132, fuel injector seat head 128, and seat 102. This alignment enables the machining bit 124 to take an accurate and precision cut-restoring or refinishing the injector seat surface. In an alternative embodiment, the collar 126 is machined as part of the body 110 and merely abuts the body 110 at the rotary end 112. The collar 126 can be an annular formation around the longitudinal axis Lx with an outside diameter greater than the head 128 of the fuel injector seat 102 to serve as a mechanical stop, preventing further insertion of the tool 100 into the fuel injector seat 102. For instance, the collar 126 may abut the fuel injector seat head 128 when the tool 100 is inserted. When the tool 100 is inserted so that the collar 126 abuts against the seat head 128, a user is assured that the tool 100 is properly inserted and that the length of the tool 100 extending into the fuel injector seat 102 corresponds to the amount material to be removed from the fuel injector seat 102. For example, as seen in FIGS. 5 and 6, the collar 126 may be configured to serve as a mechanical stop and abut the fuel injector seat head 128 of the Ford 6.7 L diesel engine.

It is contemplated that the collar 126 may have an aperture such that the first portion 118 of the rod 116 may extend beyond the body 110 and through the collar 126 to be exposed at the rotary end 112. The collar 126 can have a circular shape, square shape, hexagonal shape, have a smooth surface, have a textured surface, etc.

The tool 100 may further comprise a first bushing 130 at or near the working end 114. The bushing 130 may be attached to the rod 116 at or along the second portion 120 of the rod 116. In an alternative embodiment, the bushing 130 may be detached from the rod 116 and positioned at or near the second portion 120 of the rod 116. The bushing 130 may abut the body 110 and/or the machining bit 124 at the working end 114. The tool may further comprise a second bushing 130' at or near the rotary end 112. The bushing 130' may be attached to the rod 116 at or along the first portion 118 of the rod 116. In an alternative embodiment, the bushing 130' may be detached from the rod 116 and positioned at or near the first portion 118 of the rod 116. The bushing 130' may abut the body 110 and/or the collar 126 at the rotary end 112.

The first bushing 130 and second bushing 130' can be an annular formation around the longitudinal axis Lx and be configured to control the position of the machining bit 124 along the longitudinal axis Lx. For instance, the first bushing 130 and/or second bushing 130' may be rotated to shorten the length of the first portion 118 of the rod 116, thereby lengthening the second portion 120 of the rod 116 and extending the machining bit 124, or the bushing 130 may be rotated to lengthen the length of the first portion 118 of the rod 116, thereby shortening the second portion 120 of the rod 116 and retracting the machining bit 124. In a specific embodiment, the first bushing 130 and second bushing 130' may be attached to a threaded mechanism (not shown) positioned within the bore of the body 110. The threaded mechanism may be coil threads, spring threads, or any other suitable threaded mechanism. The threaded mechanism may surround the rod 116, such that the rod 116 is secured by the threaded mechanism. In this embodiment, the first bushing 130 and/or second bushing 130' may be rotated to actuate the threaded mechanism and thereby shorten the length of the first portion 118 of the rod 116 (thereby lengthening the second portion 120 of the rod 116 and extending the machining bit 124), or the first bushing 130 and/or second bushing 130' may be rotated to actuate the threaded mechanism and thereby lengthen the length of the first portion 118 of the rod 116 (thereby shortening the second portion 120 of the rod 116 and retracting the machining bit 124).

The tool 100 may further comprise a locknut 131 at or near the rotary end 112. The locknut 131 may be attached to the rod 116 at or along the first portion 118 of the rod 116. In an alternative embodiment, the locknut 131 may be detached from the rod 116 and positioned at or near the first portion 118 of the rod 116. The locknut 131 may abut the body 110 or the collar 126 at the rotary end 112. The locknut 131 can be an annular formation around the longitudinal axis Lx and be configured to control the position of the machining bit 124 along the longitudinal axis Lx. For instance, the locknut 131 may be rotated to shorten the length of the first portion 118 of the rod 116, thereby lengthening the second portion 120 of the rod 116 and extending the machining bit 124, or the locknut 131 may be rotated to lengthen the length of the first portion 118 of the rod 116, thereby shortening the second portion 120 of the rod 116 and retracting the bit 124. In a specific embodiment, the locknut 131 may be attached to a threaded mechanism (not shown) positioned within the bore of the body 110. The threaded mechanism may be coil threads, spring threads, or any other suitable threaded mechanism. The threaded mechanism may surround the rod 116, such that the rod 116 is secured by the threaded mechanism. In this embodiment, the locknut 131 may be rotated to actuate the threaded mechanism and thereby shorten the length of the first portion 118 of the rod 116 (thereby lengthening the second portion 120 of the rod 116 and extending the machining bit 124), or the locknut 131 may be rotated to actuate the threaded mechanism and thereby lengthen the length of the first portion 118 of the rod 116 (thereby shortening the second portion 120 of the rod 116 and retracting the machining bit 124).

It is contemplated that the locknut 131 may be, or may comprise, a dial with indicators to allow a user to know how far the machining bit 124 is extended and/or retracted. It is contemplated that the locknut 131 may have an aperture such that the first portion 118 of the rod 116 may extend beyond the body 110 and through the collar 126 to be exposed at the rotary end 112.

It is contemplated that the tool 100 is a rigid material (e.g., metal, metal alloy, plastic, polymer, ceramic, composite material, etc.).

In operation, a fuel injector is removed from the fuel injector seat 102/fuel injector valley 108/cylinder head 104. The tool 100 is then inserted into the fuel injector seat 102 such that the collar 126 abuts the cylinder head 128 and serves as a mechanical stop to prevent further insertion of the tool 100 into the fuel injector seat 102. The tool is positioned such that the second portion 120 of the rod 116 extends through the fuel injector port 106. After the tool 100 is in position, a user may rotate the first bushing 130 and/or second bushing 130' and/or locknut 131 to adjust the position of the machining bit 124 along the longitudinal axis Lx. By rotating the first bushing 130 and/or second bushing 130' and/or locknut 131, the length of the first portion 118 of the rod 116 is adjusted, thereby extending or retracting the machining bit 124. It is contemplated that the locknut 131 may be a dial with indicators, and that the user may utilize the dial extend or retract the machining bit 124 to a desired position. The machining bit 124 is configured to make contact with the fuel injector seat 102.

After the tool 100 is in position and machining bit 124 is adjusted to a desired position, a rotary unit 122 may be mounted on the first portion 118 of the rod 116. As the rotary unit 122 is actuated, the rod 116, and specifically the machining bit 124, is rotated, and the machining bit 124 performs work on the fuel injector seat 102. Work is performed on the fuel injector seat 102 until an amount of material—typically a very small amount (e.g., about 0.005")—is removed from the fuel injector seat 102.

It should be understood that modifications to the embodiments disclosed herein can be made to meet a particular set of design criteria. For instance, the number of or configuration of components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the apparatus and methods of making and using the same have been discussed and illustrated herein, it is to be distinctly understood that the invention is not limited thereto but may be otherwise variously embodied and practiced within the scope of the following claims.

What is claimed is:

1. An apparatus, comprising:
    a body having a working end and a rotary end, and a bore extending along a longitudinal axis of the body;
    a rod positioned within the bore of the body, wherein a first portion of the rod having a first length is exposed at or near the rotary end and a second portion of the rod having a second length is exposed at or near the working end, wherein the first length and the second length are configured to be adjustable; and
    a machining bit attached to the rod at or along the second portion of the rod, wherein the machining bit is configured to perform work on a fuel injector seat.

2. The apparatus of claim 1, wherein the fuel injector seat is the fuel injector seat of a 6.7 L diesel engine.

3. The apparatus of claim 1, further comprising a collar attached to the body at or near the rotary end, wherein the collar is configured to engage a head of the fuel injector seat.

4. The apparatus of claim 1, further comprising:
    a rotary unit configured to mount the first portion of the rod.

5. The apparatus of claim 4, wherein rotation of the rotary unit causes rotation of the rod within the body.

6. The apparatus of claim 1, further comprising:
    a locknut positioned at or near the first portion of the rod, wherein the locknut is configured to adjust the first length of the first portion and the second length of the second portion.

7. The apparatus of claim 6, wherein the locknut is a dial.

8. The apparatus of claim 1, wherein the second portion of the rod extends into a fuel injector port.

9. A method of resurfacing a fuel injector seat, comprising:
    inserting a tool into the fuel injector seat, wherein the tool comprises:
        a body having a working end and a rotary end, and a bore extending along a longitudinal axis of the body;
        a rod positioned within the bore of the body, wherein a first portion of the rod having a first length is exposed at or near the rotary end and a second portion of the rod having a second length is exposed at or near the working end, wherein the first length and the second length are configured to be adjustable; and
        a machining bit attached to the rod at or along the second portion of the rod, wherein the machining bit is configured to perform work on the fuel injector seat.

10. The method of claim 9, wherein the fuel injector seat is the fuel injector seat of a 6.7 L diesel engine.

11. The method of claim 9, wherein the tool further comprises a collar attached to the body at or near the rotary end, wherein the collar is configured to engage a head of the fuel injector seat, further comprising:
    positioning the tool such that the collar abuts the head of the fuel injector seat.

12. The method of claim 9, further comprising:
    positioning the tool such that the second portion of the rod extends into a fuel injector port.

13. The method of claim 9, further comprising:
    mounting the first portion of the rod with a rotary unit.

14. The method of claim 13, further comprising:
    rotating the rotary unit; and
    performing work on the fuel injector seat.

15. The method of claim 9, wherein the tool further comprises a first bushing positioned at or near the second portion of the rod and a second bushing positioned at or near the first portion of the rod, wherein the first and second bushings are configured to adjust the first length of the first portion and the second length of the second portion, further comprising:
    adjusting the first length of the first portion and the second length of the second portion using the first and second bushings.

16. The method of claim 15, further comprising:
    adjusting the first length of the first portion and the second length of the second portion using the first and second bushings such that the machining bit is configured to resurface 0.005" of material from the fuel injector seat.

17. The method of claim 9, wherein the tool further comprises a locknut positioned at or near the first portion of the rod, wherein the locknut is configured to adjust the first length of the first portion and the second length of the second portion, further comprising:
    adjusting the first length of the first portion and the second length of the second portion using the locknut.

18. The method of claim 17, further comprising:
    adjusting the first length of the first portion and the second length of the second portion using the locknut such that the machining bit is configured to resurface 0.005" of material from the fuel injector seat.

19. The method of claim 14, further comprising:
resurfacing 0.005" of material from the fuel injector seat.

20. The apparatus of claim 5, wherein the body is configured to remain fixed as rotation of the rotary unit causes rotation of the rod.

* * * * *